Sept. 25, 1945.　　　H. L. BOWERS　　　2,385,493
AIRCRAFT
Filed Aug. 13, 1942　　　3 Sheets-Sheet 1

INVENTOR
HERBERT L. BOWERS
BY
Bean, Brooks, Buckley & Bean
ATTORNEYS

Sept. 25, 1945.　　　　H. L. BOWERS　　　　2,385,493
AIRCRAFT
Filed Aug. 13, 1942　　　　3 Sheets-Sheet 2

INVENTOR
HERBERT L. BOWERS
BY
Bean, Brooks, Buckley, Bean.
ATTORNEYS

Sept. 25, 1945. H. L. BOWERS 2,385,493
AIRCRAFT
Filed Aug. 13, 1942  3 Sheets-Sheet 3

INVENTOR
HERBERT L. BOWERS
BY
Bean, Brooks, Buckley Bean.
ATTORNEYS

Patented Sept. 25, 1945

2,385,493

UNITED STATES PATENT OFFICE 2,385,493

AIRCRAFT

Herbert L. Bowers, Kenmore, N. Y., assignor to Bell Aircraft Corporation, Buffalo, N. Y.

Application August 13, 1942, Serial No. 454,629

12 Claims. (Cl. 244—121)

This invention relates to aircraft, and more particularly to improvements in sliding and detachable hatch or canopy arrangements for aircraft crew cockpits or cabins which are arranged to be artificially pressurized for the benefit of occupants when flying at high altitudes. One of the objects of the invention is to provide an improved hatch or canopy arrangement for the purpose referred to which incorporates novel features whereby the canopy and associated fuselage structures are of suitable rigidity to withstand the encountered pressure differential and whereby the hatch is adapted to be quickly released from connection to the fixed fuselage structure for emergency exit purposes in improved manner. Another object is to provide an improved aircraft cockpit enclosure arrangement comprising cooperative permanent and impermanent elements which are adapted to normally provide an atmospherically sealed structure which is adapted to be adjusted to passenger entrance and exit conditions in improved manner. More specifically, an object of the invention is to provide an improved sliding hatch and after deck arrangement for aircraft of types wherein the fuselage plan forms thereof are substantially parallel sided, whereby the after deck arrangement is adapted to be automatically adjusted between normal and collapsed positions in improved manner in connection with cockpit covering and uncovering movements of the hatch. Other objects and advantages of the invention will appear from the specification hereinafter.

In the drawings:

Fig. 4 is an enlarged detail of a fragment of the canopy release mechanism;

Fig. 7 is a detail of a hatch sealing device thereof.

The drawings illustrate the invention in conjunction with an aircraft having a crew cockpit enclosed in a fuselage or nacelle portion indicated generally at 10. The cockpit is enclosed at its forward end by means of a wind screen 12, and at its rear end by means of a stationary canopy or fuselage deck back portion 14 which is disposed in longitudinally spaced relation with respect to the wind screen 12. The space between the wind screen 12 and the canopy 14 is arranged to be enclosed by means of a hatch which is indicated generally at 15. For normal passenger entrance and exit purposes the hatch 15 is arranged to slide longitudinally of the fuselage so as to telescope over the fixed canopy portion 14 so as to uncover the space between the wind screen 12 and the canopy 14. For emergency exit purposes the hatch 15 is arranged to be completely and quickly detached from the fuselage so as to fly clear therefrom in response to the forces of gravity and/or the relative airstream.

Figure 2:
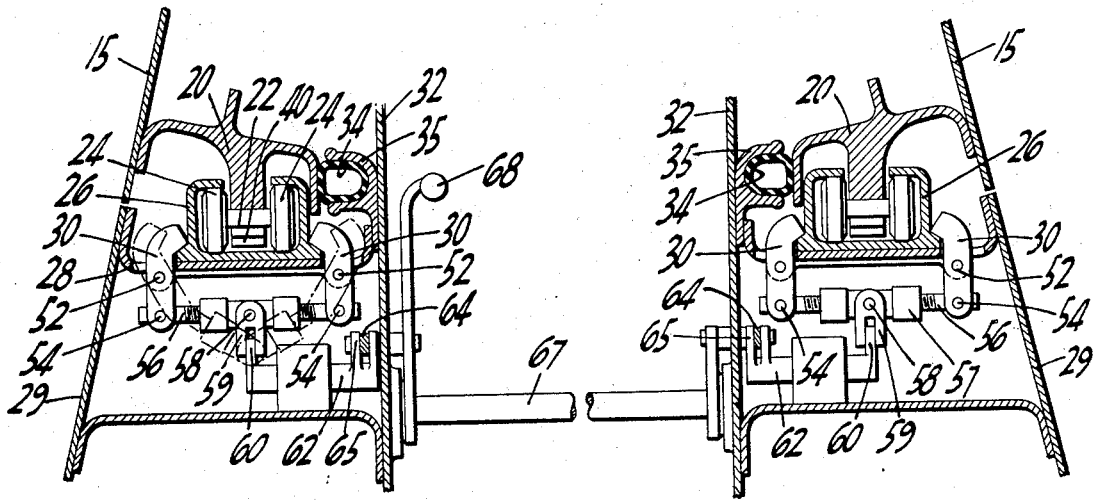
Fig. 2 is a fragmentary section, on an enlarged scale, taken along the line II—II of Fig. 1.
Figure 3:
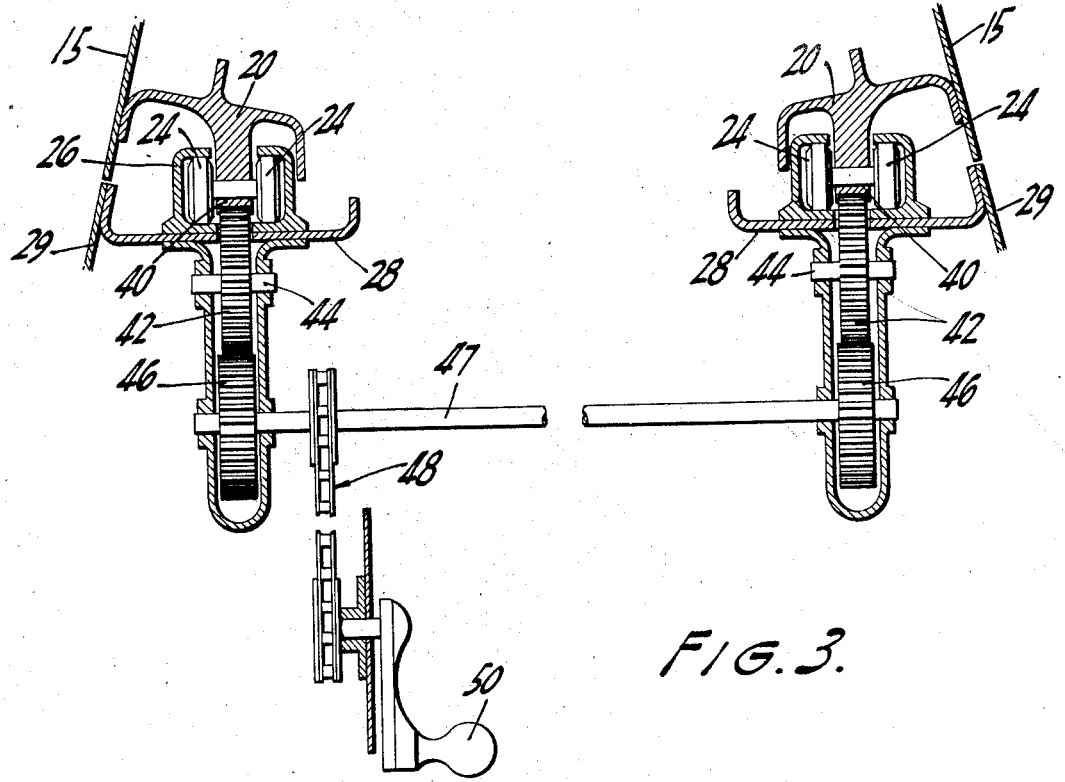
Fig. 3 is a fragmentary section, on an enlarged scale, taken along line III—III of Fig. 1.

To provide the hatch 15 to be mounted upon the fuselage 10 for the sliding movement referred to in connection with normal entrance and exit of the passengers, the hatch carries at its opposite lower side edge portions a plurality of longitudinally spaced roller devices. As illustrated by Figs. 2 and 3, the hatch is fitted adjacent each lower side edge thereof with a longitudinally extending bracket 20 upon which are mounted spaced pins 22 each carrying a pair of rollers 24—24. A trackway comprising a double channel shaped bracket 26 is mounted upon each side of the fixed fuselage structure so as to extend in registry with each system of rollers 24—24; and for this purpose the track brackets 26—26 are arranged to rest upon corresponding plates 28—28 extending rigidly from the fuselage outer side wall structure 29. Pairs of hooks 30—30 are carried by the fixed fuselage structure, as will be explained in detail hereinafter, and normally extend into hooking engagement over the opposite side edge portions of the rail brackets 26—26 so as to firmly clamp the latter against the support plates 28—28.

An inner wall plate 32 is arranged to extend rigidly from the fuselage fixed structure at each side thereof as to lie parallel to each of the brackets 20—20, and an atmosphere sealing gasket portion 34 is held by a corresponding bracket 35 to extend from each of the plates 32—32 into pressure sealing engagement against the corresponding hatch bracket 20.

Figure 1:
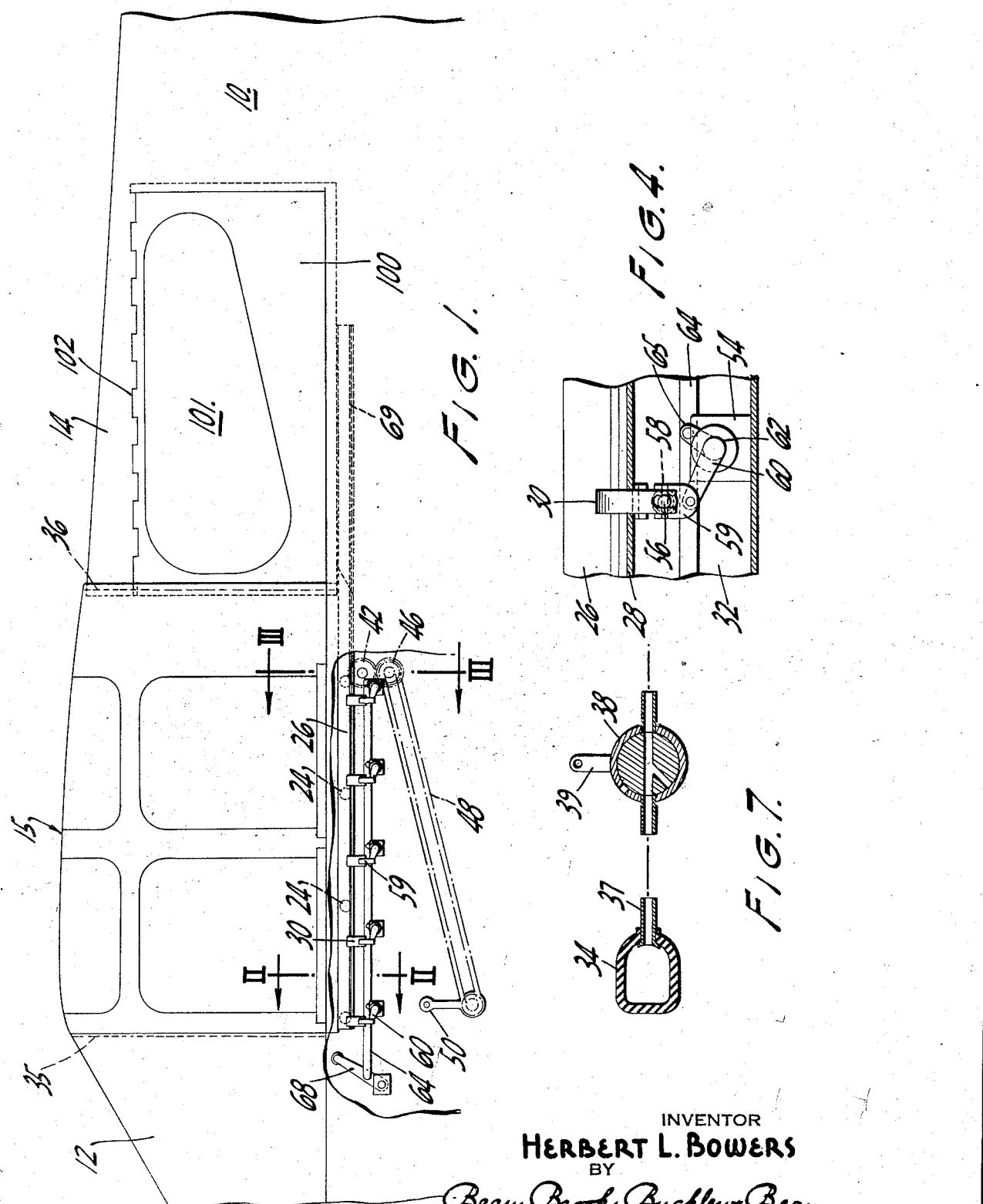
Fig. 1 is a fragmentary side elevation of an airplane cockpit enclosure arrangement of the invention, with portions broken away to show actuating mechanism therefor.
Figure 5:
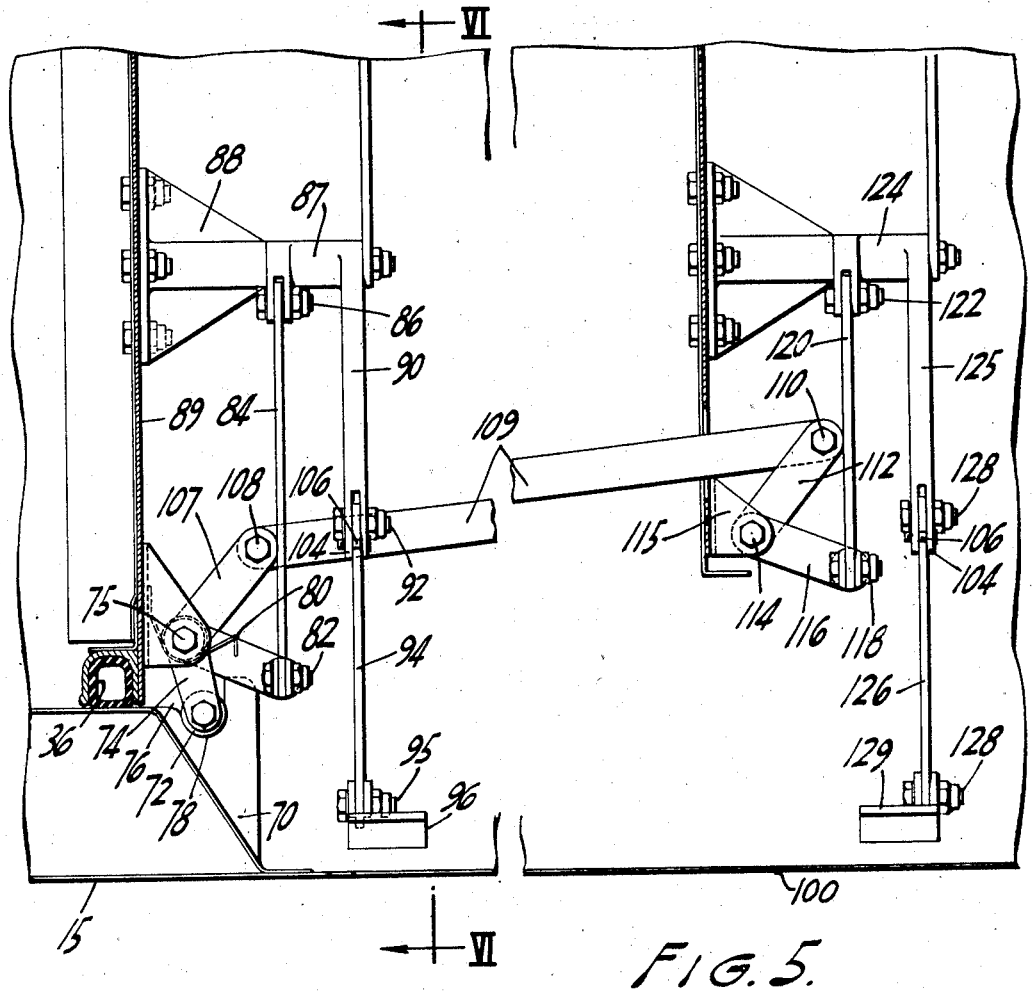
Fig. 5 is a fragmentary plan of a portion of the operating mechanism thereof.

Other gasket portions 35—36 are arranged peripherally of the front and rear ends, respectively, of the hatch 15 to engage in pressure sealing relation against contiguous portions of the wind screen 12 and the fuselage canopy or rear deck 14 to complete the pressure sealing of the cockpit when the hatch is in closed position (Figs. 1 and 5). A suitable air compression mechanism and control valve arrangement is provided in conjunction with the interior of the continuous gasket unit 34—35—36, such as a nipple 37 and a control valve 38, whereby upon closing of the hatch 15 a supply of air under pressure may be admitted to the interior of the gasket unit so as to swell the latter into pressure sealing condition between the hatch and fixed fuselage structures. Prior to cockpit uncovering movement of the hatch, the air within the gasket unit may be released, and thus it will be understood that the hatch will be free to be rolled rearwardly upon the tracks 26—26 to uncover the cockpit for normal entrance and exit of the aircraft occupants, and that in connection with such movement the hatch 15 will simply slide relative to the retracted gasket devices without damage thereto.

Preferably, the control lever 39 of the air control valve 38 will be operably associated with the hatch actuating mechanism, as will be referred to hereinafter, whereby the air pressure within the gasket will be automatically released at the commencement of each hatch uncovering movement and whereby air under pressure will be automatically delivered into the gasket upon completion of each cockpit closing movement of the hatch.

To actuate the hatch 15 between open and closed positions from interiorly of the cockpit, the brackets 20—20 are formed with longitudinally toothed rack portions 40—40 arranged in geared relation with corresponding spur gears 42—42 which are rotatably carried upon the fixed fuselage structure by means of pins 44—44. Corresponding drive gears 46—46 are meshed with the gears 42—42, and are keyed to a common shaft 47 which is arranged to be rotated through means of a sprocket-chain arrangement which is indicated generally at 48 as being manually operable by a crank handle 50 (Fig. 3). Thus, it will be understood that rotation of the crank handle 50 in opposite directions will provide corresponding backward and forward rolling movements of the hatch 15.

To permit the hatch 15 to be completely detached from the aircraft and to be blown clear thereof while the aircraft is in flight for emergency exit purposes, the hooks 30—30 which normally clamp the track brackets 26—26 to the fixed fuselage structure are arranged to be quickly swung out of clamping position in response to manual manipulation of a control device which is operable from interiorly of the cockpit. To this end the hooks 30—30 are each pivoted to the fuselage structure as at 52 (Figs. 2 and 4) and are pivotally connected at their lower ends by means of connections 54—54 to corresponding links 56—56 which screw threaded engage within sockets 57 extending into paired common pivotal connections at 58 with a clevis 59 which extends downwardly into pivotal connection with crank arm portion 60 of a control rod 62. The control rods 62 of each pair of hooks 30—30 are interconnected by means of a push pull member 64 which engages lugs 65 of the control rods; and the push pull members 64—64 at opposite sides of the hatch connect at one end of the cockpit to a common control shaft 67 having an actuating handle 68. Thus, it will be understood that simple manipulation of the control handle 68 will result in prompt disengagement of all of the clamps 30 whereby the track brackets 26—26 will be freed from the fixed fuselage structure and the entire hatch assembly detached from the aircraft. Hence, if the aircraft is flying in inverted attitude when the hooks 30 are disengaged the hatch will simply fall away from the cockpit; or if the aircraft is flying away from the cockpit so as to quickly and completely uncover the cockpit so that the occupants may escape by parachute.

The track brackets 26—26 abut at their rear ends with corresponding similar track extension members 69—69 (Fig. 1) which are permanently fixed to the main fuselage structure so as to accommodate normal rearward rolling movement of the hatch 15. However, the junctures between the forward and rearward track portions 26—69 are inclined as shown so that the forward sections 26—26 overlie the rear sections 69—69 to avoid possible interferences with emergency detachment movements of the track brackets 26—26, as explained hereinabove.

In connection with modern airplane design practice the fuselage may with facility be given a substantial curvature along its upper side view profile whereby the rear deck portion as at 14 of the aircraft of the drawings may be given a substantial slope downwardly away from the top elevation of the juncture with the sliding hatch. Hence, the hatch rails 26—26 may be disposed parallel to the fuselage center line so that movements thereof are not interfered with by gravity forces, and as the hatch slides rearwardly over the canopy 14 the hatch end structure and gasket portion 36 naturally move clear of the top surface of the canopy. However, in view of certain prime considerations with respect to the power plant and personnel space arrangements it is presently common practice to shape the fuselage of a modern aircraft so as to be substantially straight line in plan form at the mid section thereof. Consequently, the side wall portions of the rear deck as at 14 in the drawings, cannot with facility be shaped to recede inwardly to any substantial degree just aft of the sliding hatch section. Therefore, it is arranged in the case of the present invention that portions of the side wall structures of the fixed canopy or rear deck 14 will be automatically retracted inwardly in conjunction with each rearward rolling movement of the hatch 15; and the mechanism for so retracting the rear deck side wall portions is controlled by a cam mechanism which operates upon rolling movement of the hatch to alternately contract and expand the deck structure as required for the purpose referred to. Hence, the movable hatch 15 may be rolled rearwardly from cockpit closing position to telescope over the rear deck portion 14 of the fuselage for normal entrance-exit purposes without interference by the fixed fuselage parts with sliding movement of the hatch.

Figure 6:
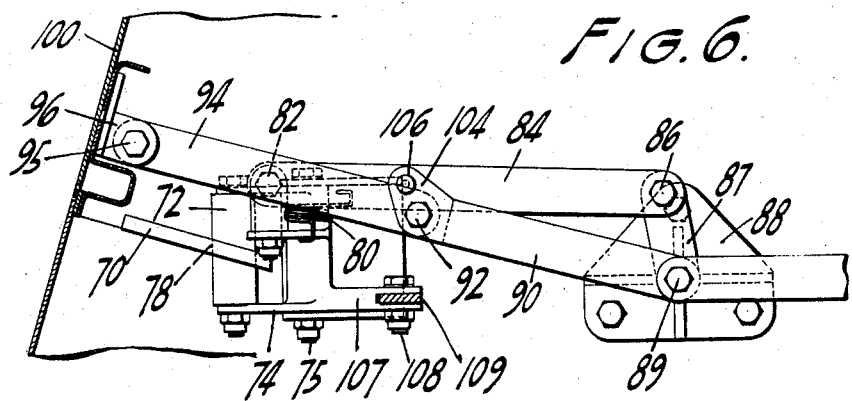
Fig. 6 is a fragmentary section taken along lines VI—VI of Fig. 5.

To this end the hatch 15 is formed at its rear end (Figs. 5 and 6) with a pair of cam plates 70 at each side thereof for camming engagement with a corresponding roller 72 carried by a bell crank 74 which is pivotally mounted upon the fixed fuselage structure by means of a pin 75. The roller 72 is arranged to bear against a camming edge portion 76 of the cam plate 70, and the cam edge 76 is formed with a well portion 78 which allows the roller to move thereinto in response to the action of a coil spring 80 whenever the hatch is in cockpit closing position. The bell crank 74 pivotally connects at its opposite end through means of a swivel connector 82 with a push-pull member 84 which extends laterally therefrom into pivotal connection at 86 to one end of a bell crank 87 which is pivotally mounted by means of a bracket 88 to a pressure tight bulkhead 89 of the aircraft structure which supports the gasket portion 36.

An arm 90 of the bell crank 87 extends toward the side wall of the deck structure to pivotally engage at 92 with a link 94 which in turn pivotally connects at 95 to a bracket 96 extending from a panel portion 100 of the corresponding side wall structure of the rear deck 14. The panel 100 may be formed with a window section 101 and is hingedly connected to the main deck structure by means of a hinge at 102, and the panel is formed to normally lie against the fixed canopy structure so as to lap firmly thereagainst peripherally of the panel 100. Suitable weather sealing gasket devices are carried by the panel 100 for compressioned engagement with the fixed deck structure when in panel-closed position so as to weather seal the structure under normal conditions against ingress of dirt and rain water and ice and the like. A crank portion 104 extends from the arm 90 to carry a transverse pin 106 for engagement with the link 94 so as to provide a knuckle type joint therebetween, whereby it will be understood that the linkage system comprising the members 90—94 extending between the pivot connections 89—95 will be limited to unidirectional folding movement and that the dead center normal position thereof will render the system irreversible. That is, the link system will be inoperable to permit retraction of the sides of the canopy in response to air loads acting against the panels 100 from exteriorly thereof, but that the panels 100 will always be free to hinge in response to operation of the cam mechanism.

The bell crank 74 includes a third arm 107 which pivotally connects at 108 to a push-pull member 109 extending toward the rear end of the panel 100 into a position of pivotal engagement 110 (Fig. 5) with one arm of a bell crank 112 which pivotally mounts at 114 upon a bracket 115 carried by the fixed fuselage structure. The other arm 116 of the bell crank connects by means of a swivel connection 118 to a link 120 extending into pivotal connection at 122 with one arm of a bell crank 124 which corresponds to the bell crank 87 hereinabove referred to. The other arm 125 of the bell crank 124 couples to a link 126 which corresponds to the link 94 hereinabove described through means of a knuckle joint connection 128; and the link 126 pivotally connects at 128 through a bracket 129 to a rear end portion of the panel 100.

Thus, it will be understood that camming movement of the roller 72 into the recess portion 78 of the cam plate 70 will force the knuckle joint links 94—126 to move the panel 100 outwardly upon its hinge connection into weather sealing relation at its edges against the adjacent fuselage canopy structure. Due to the shape of the cam edge 76 of the plate 70, however, rearward rolling movement of the hatch 15 will automatically cam the roller 92 inwardly to thereby actuate the bell crank and linkage mechanism to retract the panel 100 inwardly upon its hinge 102 so as to make room for the rearward rolling movement of the hatch 15, as explained hereinabove.

Although only one form of the invention has been illustrated and described in detail, it will be apparent to those skilled in the art that the invention is not so limited but that various changes may be made therein without departing from the spirit of the invention or the scope of the appended claims.

I claim:
1. In an aircraft, a crew cockpit, a fixed canopy partially enclosing said cockpit, a hatch normally enclosing another portion of said cockpit and movable to telescope over said fixed canopy, said fixed canopy having its opposite side wall portions hingeable to contract inwardly, and cam means carried by said hatch and connected to said canopy side wall portions for automatically actuating the latter inwardly in conjunction with telescoping movements of said hatch.

2. In an aircraft, a crew cockpit, a fixed shell structure contiguous to said cockpit, a hatch normally enclosing said cockpit and movable to telescope over said fixed structure, said fixed structure having its opposite side wall portions hingeable to contract inwardly, and cam means carried by said hatch and connected to said fixed structure side wall portions for automatically actuating the latter inwardly in conjunction with telescoping movements of said hatch.

3. In an aircraft, a crew cockpit, a fixed canopy partially enclosing said cockpit, a hatch normally enclosing another portion of said cockpit and movable to telescope over said fixed canopy, said fixed canopy having its opposite side wall portions hingeable to contract inwardly, and cam means carried by said hatch and connected to said canopy side wall portions for automatically actuating the latter inwardly in conjunction with telescoping movements of said hatch and outwardly in conjunction with cockpit covering movement of said hatch.

4. In an aircraft, a crew cockpit, a hatch normally enclosing said cockpit, track means extending longitudinally of said hatch and engaging opposite side edge portions thereof for longitudinal movement of said hatch relative to said track means, hook means carried by said aircraft to normally hook upon said track means to clamp the latter stationarily relative to said aircraft, and manually operable control means connected to said hook means for unhooking the latter to release said hatch and track unit from said aircraft.

5. In an aircraft, a crew cockpit, a fixed structure rearwardly of said cockpit, a hatch normally enclosing said cockpit and movable horizontally to telescope over said fixed structure, said fixed structure having its opposite side wall portions hingeable to contract inwardly, and cam means carried by said hatch and connected to said fixed structure side wall portions for automatically actuating the latter inwardly in conjunction with telescoping movements of said hatch and outwardly in conjunction with cockpit closing movements of said hatch.

6. In an aircraft, a crew cockpit, a hatch normally enclosing said cockpit, track means extending longitudinally of said hatch and engaging opposite side edge portions thereof for longitudinal movement of said hatch relative to said track means, hook means carried by said aircraft to normally hook upon said track means to clamp the latter stationarily relative to said aircraft, and manually operable control means connected to said hook means for unhooking the latter to release said hatch and track unit from said aircraft, and extension track members fixed to said aircraft to extend in continuation of said track means but freed from said track means whereby said hatch and track unit may move clear of said aircraft without interference from said extension track members.

7. In an aircraft, a crew cockpit, a hatch normally enclosing said cockpit, track means extending longitudinally of said hatch and engaging opposite side edge portions thereof for longitudinal movement of said hatch relative to said track means, self-locking toggle-type hook means carried by said aircraft to normally hook upon said track means to clamp the latter stationarily relative to said aircraft, and manually operable control means connected to said hook means for unhooking the latter to release said hatch and track unit from said aircraft.

8. In an aircraft, a crew cockpit, a hatch normally enclosing said cockpit, track means extending longitudinally of said hatch and engaging opposite side edge portions thereof for longitudinal movement of said hatch relative to said track means, hook means carried by said aircraft to normally hook upon said track means to clamp the latter stationarily relative to said aircraft, manually operable control means connected to said hook means for unhooking the latter to release said hatch and track unit from said aircraft, and inflatable gasket means carried by said aircraft to extend toward said hatch and adapted to avoid interference with said longitudinal movement thereof when deflated and to be inflated to extend into pressure sealing contact relation with said hatch.

9. In an aircraft, a fuselage having a crew cockpit, a fixed compartment structure contiguous to said cockpit, a hatch normally enclosing said cockpit and movable to telescope over said fixed structure, gasket means carried by said fuselage and said fixed structure to contact said hatch in pressure sealing relation, said fixed structure having its opposite side wall portions hingeable to contract inwardly, and cam means carried by said hatch and connected to said fixed structure side wall portions for automatically actuating the latter inwardly in conjunction with telescoping movements of said hatch.

10. In an aircraft, a fuselage having a crew cockpit, a fixed structure contiguous to said cockpit, a hatch normally enclosing said cockpit and movable to telescope over said fixed structure, inflatable gasket means carried by said fuselage and said fixed structure to contact said hatch in pressure sealing relation and deflatable to disengage said hatch from said fuselage and said fixed structure, said fixed structure having its opposite side wall portions hingeable to contract inwardly, and cam means carried by said hatch and connected to said fixed structure side wall portions for automatically actuating the latter inwardly in conjunction with telescoping movements of said hatch.

11. In an aircraft, a crew cockpit, a fixed shell structure contiguous to said cockpit, a hatch normally enclosing said cockpit and movable to telescope over said fixed structure, said fixed structure having its opposite side wall portions hingeable to contract inwardly, cam means carried by said hatch, toggle link means connected to said fixed structure side wall portions and engageable by said cam means for automatically actuating the latter inwardly in conjunction with telescoping movements of said hatch.

12. In an aircraft, a crew cockpit, a hatch normally enclosing said cockpit, track means extending longitudinally of said hatch and engaging opposite side edge portions thereof for longitudinal movement of said hatch relative to said track means, a plurality of spaced hook means carried by said aircraft longitudinally thereof to normally hook upon said track means to clamp the latter stationarily relative to said aircraft, and control means connected to said hook means for unhooking the latter simultaneously to release said hatch and track unit from said aircraft.

HERBERT L. BOWERS.